United States Patent [19]
Dorlars et al.

[11] 3,839,333
[45] Oct. 1, 1974

[54] 3-PYRAZOLYL-(1)-7-V-TRIAZOLYL-(2)-COUMARINS

[75] Inventors: Alfons Dorlars, Leverkusen; Wolf-Dieter Wirth, Cologne, both of Germany

[73] Assignee: Farbenfabriken Bayer Aktiengesellschaft, Leverkusen, Germany

[22] Filed: May 22, 1972

[21] Appl. No.: 255,906

Related U.S. Application Data

[63] Continuation of Ser. No. 787,608, Dec. 27, 1968, abandoned.

[52] U.S. Cl........ 260/249.5, 260/308 A, 260/249.6, 252/301.2 W, 117/33.5 T, 8/1 W
[51] Int. Cl. ... C07d 55/18, C07d 55/20, C07d 7/26
[58] Field of Search........... 260/308 A, 249.6, 249.5

[56] References Cited
UNITED STATES PATENTS

| | | | |
|---|---|---|---|
| 3,271,412 | 9/1966 | Raue et al.......................... | 260/308 |
| 3,496,188 | 2/1970 | Wirth................................ | 260/308 |
| 3,663,560 | 5/1972 | Schellhammer et al........... | 260/308 |

*Primary Examiner*—John M. Ford

[57] ABSTRACT

3-[Pyrazolyl-(1)]-7[v-triazolyl-(2)]-coumarins of the formula

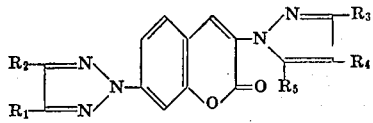

in which $R_1$ is hydrogen or an optionally substituted alkyl or aryl radical; $R_2$ is an optionally substituted alkyl or aryl radical, cyano, the carboxylic acid group, an alkoxy-carbonyl group, an optionally substituted carboxylic acid amide group or an acylated amino group; $R_1$ together with $R_2$ and the two carbon atoms of the triazole ring may form a 5- or 6-membered non-aromatic ring system; and $R_3$, $R_4$ and $R_5$, independently of one another, stand for hydrogen or an optionally substituted alkyl or aryl radical. These compounds are useful as brightening agents.

6 Claims, No Drawings

3-PYRAZOLYL-(1)-7-V-TRIAZOLYL-(2)-COUMARINS

This is a continuation of U.S. application Ser. No. 787,608, filed Dec. 27, 1968, now abandoned.

The object of the present invention comprises 3-[pyrazolyl-(1)]-7-[v-triazolyl-(2)]-coumarins of the general formula

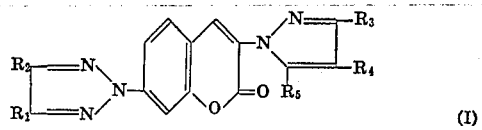

(I)

in which $R_1$ denotes hydrogen or an optionally substituted alkyl or aryl radical; $R_2$ means an optionally substituted alkyl or aryl radical, cyanogen, a carboxylic acid group, an alkoxy-carbonyl group, an optionally substituted carboxylic acid amide group or an acylated amino group; $R_1$ together with $R_2$ and the two carbon atoms of the triazole ring may form a 5- or 6-membered non-aromatic ring system; $R_3$, $R_4$ and $R_5$, independently of one another, denote hydrogen or an optionally substituted alkyl or aryl radical, as well as their production and use.

The optionally substituted alkyl radicals represented by $R_1$ and/or $R_2$ comprise straight-chain branched or cyclic, saturated or unsaturated alkyl groups with 1 – 12 carbon atoms, which may be substituted by substituents such as halogen atoms, for example, fluorine, chlorine or bromine; hydroxyl groups; alkoxy groups with 1 – 4 carbon atoms; alkoxy-carbonyloxy groups with 1 – 4 carbon atoms in the alkyl radical; carboxylic acid groups; alkoxy-carbonyl groups with 1 – 4 carbon atoms in the alkyl groups; and phenyl radicals which may carry halogen atoms, lower alkyl and alkoxy groups.

Examples of alkyl radicals $R_1$ and $R_2$ are: methyl, benzyl, p-chlorobenzyl, ethyl, p-hydroxyethyl, p-chloroethyl, carboxyethyl, carbethoxyethyl, ethoxyethyl, styryl, p- and iso-propyl, p- and iso-butyl, isobutenyl, pentyl, hexyl, cyclohexyl, octyl, decyl, dodecyl and acetoxyethyl radicals.

The optionally substituted aryl radicals $R_1$ and $R_2$ include, for example, naphthyl or, preferably, phenyl radicals which may carry one or more substituents, for example, fluorine, chlorine, bromine, cyanogen; lower alkyl groups with 1 – 4 carbon atoms; lower alkoxy groups with 1 – 4 carbon atoms; the carboxyl group; alkoxy-carbonyl groups with 1 – 5 carbon atoms; alkylsulphonyl groups with 1 – 4 carbon atoms.

Examples of such radicals are the following: phenyl, o-, m- and p-fluorphenyl, o-, m- and p-chlorophenyl, o-, m- and p-bromophenyl, o-, m- and p-tolyl, p-benzylphenyl, o-, m- and p-anisyl, m- and p-cyanophenyl, p-benzyloxyphenyl, m- and p-ethoxycarbonyl-phenyl, m- and p-methoxycarbonylphenyl, m- and p-methanesulphonylphenyl, and m- and p-ethanesulphonylphenyl radicals.

Non-aromatic ring systems which are anellated to the triazole ring and may be represented by $R_1$ and $R_2$ together with the two carbon atoms of the triazole ring, are, in particular, cyclopentane and cyclohexane rings which, in turn, may be anellated to a benzene ring. The following are examples of these anellated systems:

Suitable alkoxy-carbonyl groups $R_2$ are those with 1 – 4 carbon atoms in the alkoxy group, such as methoxycarbonyl radicals or butoxy-carbonyl radicals.

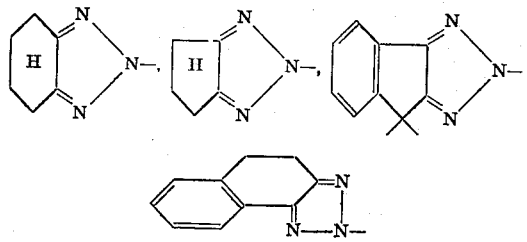

The term "optionally substituted carboxylic acid amide group" comprises a carboxylic acid amide group which may be mono- or disubstituted by alkyl radicals with 1 – 4 carbon atoms, which may be further substituted. Examples are the groups —$CONH_2$, —$CONHCH_3$, —$CONHC_4H_9$, —$CON(CH_3)_2$ and —$CON(C_4H_9)_2$.

Suitable acylamino groups $R_2$ are, for example amino groups which are linked to one of the following acyl radicals: alkoxy-carbonyl groups with 1 – 4 carbon atoms in the alkoxy group; alkyl-carbonyl groups with 1 – 10 carbon atoms in the alkyl radical; alkenyl-carbonyl groups with 1 – 10 carbon atoms in the alkenyl radical; aryl-carbonyl groups, particularly phenyl-carbonyl groups which may be substituted; and triazinyl groups which may be further substituted by halogen, alkyl, alkoxy, aryloxy, amino, alkylamino, dialkylamino, arylamino, alkylarylamino or aryl radicals. Moreover the N-pyrrolidonyl group should be mentioned.

Examples of the aforesaid aliphatic and aromatic acyl radicals are: acetyl, chloroacetyl, ethoxyacetyl, propionyl, butyryl, isobutyryl, valeryl, pivaloyl, benzoyl, o-, m- and p-toluyl, o-, m- and p-chlorobenzoyl, o-, m- and p-anisoyl, 2,4-dimethoxybenzoyl, 4-chloro-6-methoxy-s-triazinyl-(2), 4-chloro-6-ethoxy- and -propoxy-s-triazinyl-(2), 4,6-bis-dimethylamino-, -diethylamino- and -dipropylamino-s-triazinyl-(2), 4,6-bis-dimethylamino-, 4-ethylamino- and -dipropylamino-6-anilino-s-triazinyl-(2), and 4-methyl-6-methoxy- and -ethoxy-s-triazinyl-(2) radicals.

Suitable alkyl substituents $R_3$, $R_4$ and $R_5$ are primarily those with 1 – 4 carbon atoms. Suitable aryl radicals, $R_3$, $R_4$ and $R_5$ are primarily phenyl radicals which may be substituted, for example, by halogen, such as Cl or Br, and by alkyl or alkoxy groups.

The new pyrazolyl-triazolyl-coumarins of the formula (I) may be prepared by several methods. Those compounds of the formula (I) in which $R_2$ stands for an optionally substituted alkyl or aryl radical and the symbols $R_1$, $R_3$, $R_4$ and $R_5$ have the same meaning as above, can be obtained, for example, by condensing 7-hydrazino-coumarin derivatives of the formula

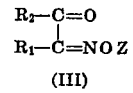

(II)

in which $R_3$, $R_4$ and $R_5$ have the same meaning as above, with β-oximino-ketones of the formulae $R_2$—C=O
$R_1$—C=NOZ (III)

or

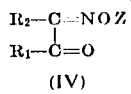

(IV)

in which $R_1$ and $R_2$ have the same meaning as above and Z stands for hydrogen or an acyl radical, e.g., for the acetyl radical,
and converting the resultant α-oximino-hydrazones of the formulae

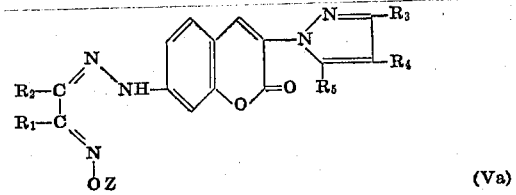

(Va)

or

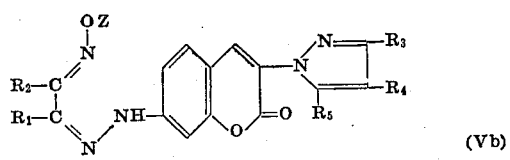

(Vb)

into the 7-v-triazolyl-(2)-coumarin compounds of the formula (I) in which $R_2$ has the same meaning as above with the elimination of HOZ, and, if desired, subsequently converting the substituents $R_1$ or $R_2$ in known manner.

The elimination of HOZ is carried out, for example, by simple heating or by heating with dehydrating agents, such as acetic anhydride, optionally in the presence of sodium acetate, at elevated temperatures, for example, 90° – 125°C; it is also possible to work in mixtures of acetic anhydrides and strongly polar solvents, such as dimethyl formamide.

The aforesaid 7-hydrazino-coumarins of the formula (II) can be prepared in known manner by condensing 4-acetamino-2-hydroxy-benzaldehyde, or its anil, with pyrazolyl-acetic acid of the formula

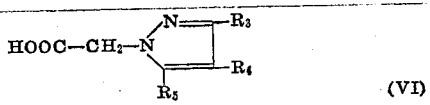

(VI)

in which $R_3$, $R_4$ and $R_5$ have the same meaning as above, to form 7-acetoamino-3-[pyrazolyl-(1)]-coumarins, subsequently hydrolysing the acetoamino group to form the amino group, diazotising the latter and reducing the resultant diazonium group in a suitable manner to form the hydrazino group.

Suitable pyrazolyl-acetic acids (VI) are, for example: pyrazolyl-(1)-acetic acid, 3-methyl-pyrazolyl-(1)-acetic acid, 3-phenyl-pyrazolyl-(1)-acetic acid, 3-phenyl-4-methyl-pyrazolyl-(1)-acetic acid, 3-p-tolyl-pyrazolyl-(1)-acetic acid, 3-p-anisyl-pyrazolyl-(1)-acetic acid, 3,5-dimethyl-pyrazolyl-(1)-acetic acid.

Suitable compounds (III) or (IV) are, inter alia: oximino-acetone, diacetylmonoxime, 1-oximino-butanone-(2), 2-oximino-1-phenyl-butanone-(3), 1,3-diphenyl-1-oximino-propanone-(2), oximinobenzylcyclohexylketone, 1-oximino-4-phenyl-buten-(3)-one-(2), 2-oximino-pentanone-(3), 3-oximino-4-methyl-pentanone-(2), 1-oximino-4-methyl-penten-(3)-one-(2), 3-oximino-pentanol-(5)-one-(2), 3-oximino-hexanone-(2), 2-oximino-5-methyl-hexanone-(3), 2-oximino-heptanone-(3), 3-oximino-heptanone-(4), 3-oximino-octanone-(2), 4-oximino-nonanone-(5), 3-oximinoundecanone-(2), 3-oximino-tridecanone-(2), oximinoacetophenone, p-fluoro-, p-chloro- and p-bromo-oximino-acetophenone, p-methyl- and p-methoxy-oximino-acetophenone, 2,4- and 3,4-dimethyl-oximino-acetophenone, oximino-propiophenone, p-fluoro-, p-chloro- and p-bromo-oximino-propiophenone, p-methyl-, p-benzyl-, p-dimethylbenzyl, p-ethyl-, p-tert.butyl-oximino-propiophenone, p-methoxy- and p-ethoxy-oximino-propiophenone, p-benzyloxy-oximino-propiophenone, 2,5-dimethyl-oximino-propiophenone, 2-oximino-1,3-diphenylpropanone-(1), 1-oximino-1-phenyl-acetone, 1-oximino-1-o-,m-, and p-tolyl-acetone, 1-oximino-1-o-, -m-, and -p-anisyl-acetone, 1-oximino-1-o-, -m- and -p-chlorophenyl-acetone, 1-oximino-1-m- and p-cyanophenyl-acetone, 1-oximino-1-m and -p-carbethoxyphenylacetone, 1-oximino-1-m- and -p-methane-sulphonylphenyl-acetone, 1-oximino-1,3-diphenyl-acetone, oximino-butyrophenone, γ-benzoyl-γ-oximino-butyric acid-methyl and -ethyl ester, oximino-valerophenone, oximino-1- and -2-propionaphthone, benzil-monoxime, tolil-monoxime, and anisil-monoxime, oximinocyclopentanone, oximino-cyclohexanone, 2-oximino-indanone-(1), 2-oximino-tetralone-(1).

Pyrazolyl-triazolyl-coumarins of the formula (I) in which $R_2$ stands for cyanogen, the carboxyl group, a carboxylic acid ester group or an optionally substituted carboxylic acid amide group and the symbols $R_1$, $R_3$, $R_4$ and $R_5$ have the same meaning as above, can be obtained, for example, by diazotising 7-amino-coumarin derivatives of the formula

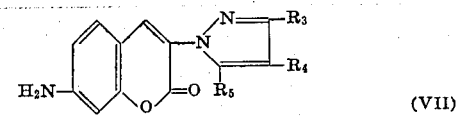

(VII)

in which $R_3$, $R_4$ and $R_5$ have the same meaning as above, coupling with enamines of the formula

(VIII)

in which $R_1$ and $R_2$ have the same meaning as above, e.g., with β-aminocrotonic acid nitrile, esters or amides, or with β-aminocinnamic acid nitrile, esters or amides, converting the resultant azo compounds of the formula

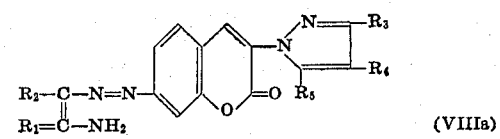

(VIIIa)

in which $R_1 - R_5$ have the same meaning as above, with the aid of copper(II) salts into the copper complexes, converting the latter by heating in the presence of an excess of a complex copper(II) salt solution into the 7-v-triazolyl-(2)-coumarin compounds, and, if desired, hydrolysing the carboxylic acid nitrile, ester or amide group to form the carboxyl group.

Those pyrazolyl-triazolyl-coumarins of the formula (I) in which $R_2$ stands for an acylated amino group and $R_1$, $R_3$, $R_4$ and $R_5$ have the same meaning as above, can be prepared, for example, by coupling diazo compounds of 7-aminocoumarin compounds of the formula (VII) with α-nitro-oximes of formula

(IX)

in which $R_1$ has the same meaning as above, for example, with nitroacetaldoxime or with ω-nitroacetophenone-oxime, cyclising the resultant azo compounds to form the corresponding 7-(4-nitro-triazolyl-(2))-coumarin compounds, reducing the latter to form the amino compounds of the formula

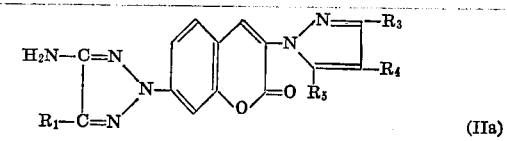
(IIa)

and converting the latter into the acylamino compounds.

Pyrazolyl-triazolyl-coumarins of the formula (I) in which $R_2$ stands for an acylated amino group, $R_1$ means an optionally substituted aryl radical, and $R_3$, $R_4$ and $R_5$ have the same meaning as above, can also be obtained by condensing 7-hydrazino-coumarin compounds of the formula (II) with 1,2,4-oxodiazoles of the formula

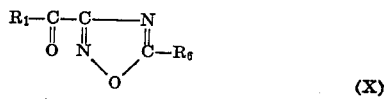
(X)

in which $R_6$ stands for an alkyl or aryl radical and $R_1$ has the same meaning as above, rearranging the resultant hydrazones to form 7-v-triazolyl-(2)-coumarin compounds of the formula

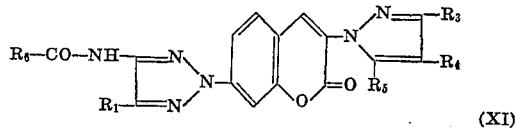
(XI)

and, if necessary, replacing the acylamino group $R_6$—CO—NH with the acylamino group $R_2$.

The new pyrazolyl-triazolyl-coumarins of the formula (I) are valuable brightening agents. They are suitable for brightening a great variety of materials, especially for the brightening of fibres, filaments, fabrics, knitted fabrics and foils of synthetic origin, primarily for brightening materials of polyesters, polyurethanes, polycarbonates and polyvinyl chloride, and for brightening varnishes of cellulose esters and nitro-cellulose. They can be applied in the usual manner, for example, in the form of aqueous dispersions or in the form of solutions in inert solvents; if desired, they can also be used in combination with detergents or added to casting masses which serve for the production of foils or filaments. On account of their high stability, they can, for example, be added to polyesters during their production from the components; to polycondensates they can be added after pre-condensation or during polycondensation. The amounts of pyrazolyl-triazolyl-coumarins required in any given case can easily be established by preliminary experiments; in general, amounts of 0.01 – 1 percent, referred to the weight of the material to be treated, will suffice. The pyrazolyl-triazolylcoumarins of the formula (I) are highly productive brightening agents; the brightening effects achieved are very fast to light and usually have an excellent fastness to washing.

Compared with the 3-pyrazolyl-7-benzo- and -naphthotriazolyl-coumarins described in Belgian Pat. No. 681,962, the new coumarin derivatives of the formula (I) which are substituted by monocyclic triazolyl-(2) radicals, have a substantially improved affinity to polyester materials; compared with the 3-aryl-7-triazolyl-(2)-coumarins described in Belgian Pat. No. 695,656 and also with the coumarin compounds described in the first-mentioned Belgian Patent Specification, the pyrazolyl-triazolyl-(2)-coumarins of the formula (I) are characterised by stronger, clearer and more brillant brightening effects where polyester materials are treated according to the thermosol process.

The temperatures in the Examples are given in degrees Centigrade.

EXAMPLE 1

Preparation of 3-[pyrazolyl-(1)]-7-[4-phenyl-5-methyl-v- triazolyl-(2)]-coumarin 7-Hydrazino-3-[pyrazolyl-(1)]-coumarin 228 g (1 mol) 7-amino-3-[pyrazolyl-(1)]-coumarin are dissolved in a hot mixture of 1.25 litres of water and 2.5 litres of concentrated hydrochloric acid. The clear solution is cooled, and 15 ml of a sodium nitrite solution prepared by dissolving 69 g (1mol) sodium nitrite in 200 ml of water is added in one jet at 12 – 15° while stirring. When the mixture is further cooled to 5° – 10°, no precipitate occurs. The diazotisation is completed at this temperature by the dropwise addition of the remaining nitrite solution in the course of about one-half hour while stirring. A solution of 565 g (2.5 mol) tin (II) chloride dihydrate in 580 ml of concentrated hydrochloric acid is then slowly added dropwise at 0° – 5° with external cooling. The yellow-brown precipitate thus formed is sharply filtered off with suction after standing for several hours, and stirred with water. The pH value of the initially acidic suspension is adjusted to about 8.5 by the dropwise addition of concentrated aqueous ammonia. After stirring for two hours, the precipitated hydrazine which is contaminated with tin compounds is filtered off with suction, dried in a vacuum and exhaustively extracted with hot glycol monomethyl ether acetate. After removal of the extraction agent, the hydrazino-pyrazolyl-coumarin is obtained in the form of yellow crystals of melting point 194° – 196°.

Yield: 214 g = 88.5 percent of theory.

Condensation with α-oximino-propiophenone and closure of the triazole ring:

206 g (0.85 mol) 7-hydrazino-3-[pyrazolyl-(1)]-coumarin are stirred with 150 g (0.92 mol) α-oximino-propiophenone in 1.4 litres glycol monomethyl ether and 40 ml of 50 percent acetic acid at 90° – 95° for 4 hours; free hydrazine can then no longer be detected. About half of the solvent is then removed under reduced pressure and the residue is mixed dropwise with 800 ml of hot water while stirring. After cooling to room temperature, the precipitated yellow oximino-hydrazone is filtered off with suction, washed with a little cooled methanol and dried at 60° in a vacuum. Yellow crystals (isopropanol), melting point 248° – 250°; yield 299 g = 91 of theory.

298 g (0.77 mol) α-oximino-hydrazone are stirred in 2.2 litres acetic anhydride with 30 g of anhydrous sodium acetate at 95° – 110° for 3½ hours. A clear solution is formed after about 1 hour; the resultant triazole is subsequently precipitated in part in the the form of light-coloured crystals. Heating is continued at 125° for about 10 minutes and a total of 1.4 litres acetic acid and the excess acetic anhydride are then distilled off under reduced pressure. The mixture is then cooled to 5°, the precipitated cyrstals are sharply filtered off with suction, washed with a little cold methanol and with warm water, and subsequently dried at 80° – 90°. 252 g of crude triazole are obtained. For purification, the crude product is recrystallized from chlorobenzene and subsequently from dimethyl formamide: 179 g (65 percent of theory) of 3-[pyrazolyl-(1)]-7-[4-phenyl-5-methyl-v- triazolyl-(2)]-coumarin (1a) are thus obtained in the form of almost colourless light crystals of melting point 208° – 209°.

The compound (1a) is obtained in similar yields and with a similar degree of purity when the α-oximino-hydrazone is reacted in an analogous manner in a mixture of 1.5 litres dimethyl formamide and 0.1 litre acetic anhydride, instead of in excess acetic anhydride.

The compounds of the formula (I) listed in the following Table under (b) – (g₁) can be prepared in an analogous manner from 7-hydrazino-3-[pyrazolyl-(1)]-coumarin and the corresponding α-oximino-ketones; the compounds (h₁) and (i₁) were prepared from 7-hydrazino-3-[3-methylpyrazolyl- (1)]-coumarin, the compounds (k₁) (l₁) and (m₁) from 7-hydrazine-3-[3,5-dimethylpyrazolyl-(1)]-, -[3-phenylpyrazolyl- (1)]-, or -[3-phenyl-4-methylpyrazolyl-(1)]-, or -[3-phenyl- 4-methylpyrazolyl-(1)]-coumarin, and the specified α-oximino- ketones.

TABLE 3-pyrazolyl-7-triazolyl-coumarins of the formula

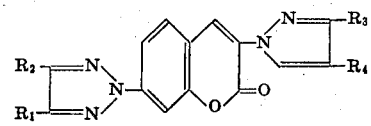

| No. | R₁ | R₂ | R₃ | R₄ | R₅ | α-Oximino-ketone |
|---|---|---|---|---|---|---|
| 1(b) | H | CH₃ | H | H | H | Oximino-acetone. |
| 1(c) | CH₃ | CH₃ | H | H | H | Diacetyl-monoxime. |
| 1(d) | C₂H₅ | CH₃ | H | H | H | 2-oximino-pentanone-(3). |
| 1(e) | CH₃ | i–C₃H₇ | H | H | H | 2-methyl-3-oximino-pentanone-(4). |
| 1(f) | n–C₃H₇ | C₂H₅ | H | H | H | 3-oximino-heptanone-(4). |
| 1(g) | n–C₄H₉ | n–C₃H₇ | H | H | H | 4-oximino-nonanone-(5). |
| 1(h) | CH₃ | n–C₁₀H₂₁ | H | H | H | 3-oximino-tridecanone-(2). |
| 1(i) | CH₃ | ⌬–CH₂ | H | H | H | 2-oximino-1-phenylbutanone-(3). |
| 1(k) | H | ⌬– | H | H | H | Oximino-acetophenone. |
| 1(l) | H | CH₃–⌬– | H | H | H | 4-methyl-oximino-acetophenone. |
| 1(m) | H | Cl–⌬– | H | H | H | 4-chloro-oximino-acetophenone. |
| 1(n) | H | CH₃O–⌬– | H | H | H | 4-methoxy-oximino-acetophenone. |
| 1(o) | H | F–⌬– | H | H | H | 4-fluoro-oximino-acetophenone. |
| 1(p) | ⌬– | CH₃ | H | H | H | 1-oximino-1-phenyl-acetone. |
| 1(q) | Cl–⌬– | CH₃ | H | H | H | 4-chloro-oximino.propiophenone. |
| 1(r) | ⌬(Cl)– | CH₃ | H | H | H | 1-o-chlorophenyl-1-oximino-acetone. |
| 1(s) | ⌬(CH₃)– | CH₃ | H | H | H | 1-m-tolyl-1-oximino-acetone. |
| 1(t) | C₂H₅O–⌬– | CH₃ | H | H | H | 4-ethoxy-oximino-propiophenone. |
| 1(u) | C₂H₅–⌬– | CH₃ | H | H | H | 4-ethyl-oximino-propiophenone. |

TABLE —Continued

| No. | R₁ | R₂ | R₃ | R₄ | R₅ | α-Oximino-ketone |
|---|---|---|---|---|---|---|
| 1(v) | m-NC-C₆H₄- | CH₃ | H | H | H | 1-m-cyanophenyl-1-oximinoacetone. |
| 1(w) | p-(C₂H₅OCO)-C₆H₄- | CH₃ | H | H | H | 1-p-carbethoxyphenyl-1-oximino-acetone. |
| 1(x) | C₆H₅- | C₂H₅ | H | H | H | Oximino-butyrophenone. |
| 1(y) | C₆H₅- | C₆H₅-CH₂- | H | H | H | 2-oximino-1,3-diphenylpropanone-(1) or 1-oximino-1,3-diphenylacetone. |
| 1(z) | Same as above | C₆H₅- | H | H | H | Benzil-monoxime. |
| 1(a₁) | CH₃-C₆H₄- | CH₃-C₆H₄- | H | H | H | Tolil-monoxime. |
| 1(b₁) | C₆H₅- | C₃H₇ | H | H | H | Oximino-valerophenone. |
| 1(c₁) | —(CH₂)₃— | | H | H | H | Oximino-cyclopentanone. |
| 1(d₁) | o-CH₃-C₆H₄-CH₂- | | H | H | H | 2-oximino-indanone-(1). |
| 1(e₁) | C₆H₅-CH₂- | C₆H₅-CH₃ | H | H | H | p-Benzyl-oximino-propiophenone. |
| 1(f₁) | p-(C₆H₅-CH₂O)-C₆H₄- | Same as above | H | H | H | p-Benzyloxy-oximino-propiophenone. |
| 1(g₁) | H-C₆H₄- | C₆H₅- | H | H | H | Oximinobenzyl-cyclohexylketone. |
| 1(h₁) | H | Same as above | CH₃ | H | H | Oximino-acetophenone. |
| 1(i₁) | CH₃ | do | CH₃ | H | H | Oximino-propiophenone. |
| 1(k₁) | CH₃ | do | CH₃ | H | CH₃ | Do. |
| 1(l₁) | H | CH₃ | | C₆H₄ | H | Oximino-acetone. |
| 1(m₁) | H | CH₃ | | Same as above | CH₃ | H | Do. |

EXAMPLE 2 a. 23 g (0.1 mol) 7-amino-3-[pyrazolyl-(1)]-coumarin are introduced at 15° to 20° within one-half hour while stirring into 195 g (107 ml) of concentrated sulphuric acid. Diazotisation is carried out at this temperature by the addition of 31 g nitrosyl-sulphuric acid (with a content of 22.1 g sodium nitrite per 100 g). After further stirring for about 1 hour, the sulphuric acid diazo solution is poured into about 1 kg of a mixture of ice and water and the free sulphuric acid is buffered by slowly adding 232 g of anhydrous sodium carbonate while cooling. At a pH value of 5 and at 10° – 15° a solution of 19.6 g (0.105 mol) β-aminocinnamic acid ethyl ester in 200 ml alcohol is added, care being taken that the pH value does not fall below 5. The coupling is completed after about 2 hours. The precipitated orange-brown azo compound is filtered off with suction, washed with water, and dreid at 60° under reduced pressure. Yield: 41 g.

41 g of the dry azo dyestuff so obtained are stirred in 400 ml pyridine, and 38 g copper (II) acetate are slowly added at 50° while stirring. Stirring is continued at this temperature for 6 hours and at 75° for 1 hour; the bulk of the pyridine is then distilled off under reduced pressure, and the residue is mixed with 300 ml of 60 percent aqueous methanol. The resultant precipitate is filtered off with suction while still hot, dried and extracted with chlorobenzene. The crude product remaining after evaporation of the extraction agent is reprecipitated from glycol monomethyl ether and subsequently from dimethyl formamide for purification. The crystalline product is filtered off with suction, washed with cold methanol, and dried. There are obtained 30.2 g (70.7 percent of theory) of white 3-[pyrazolyl-(1)]-7-[4-carbethoxy- 5-phenyl-v-triazolyl-(2)]-coumarin of melting point 219° – 220°.

The pyrazolyl-v-triazolyl-coumarin compounds listed in the following Table can be prepared in an analogous manner from 7-amino-3-[pyrazolyl-(1)]-coumarin (b) – (f) or 7-amino-3-[3-phenyl-pyrazolyl-(1)]-coumarin (g). The anamines used as coupling components are stated in the right- hand column.

TABLE 3-pyrazolyl-7-triazolyl-coumarins of the formula

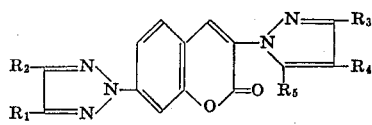

| No. | R₁ | R₂ | R₃ | R₄ | R₅ | Enamine |
|---|---|---|---|---|---|---|
| 2(b) | ⌬ | CN | H | H | H | β-Aminocinnamic acid nitrile. |
| 2(c) | Same as above | CONH₂ | H | H | H | β-Aminocinnamic acid amide. |
| 2(d) | CH₃ | COOC₂H₅ | H | H | H | β-Aminocrotonic acid ethyl ester. |
| 2(e) | CH₃ | CN | H | H | H | β-Aminocrotonic acid nitrile. |
| 2(f) | ⌬ | COOH | H | H | H | β-Aminocinnamic acid ethyl ester, hydrolysed. |
| 2(g) | CH₃ | COOC₂H₅ | ⌬ | H | H | β-Aminocrotonic acid ethyl ester. |

EXAMPLE 3 a. 23 g (0.1 mol) 7-amino-3-[pyrazolyl-(1)]-coumarin are diazotised as described in Example 2. The resultant diazo solution is buffered with sodium-carbonate and added dropwise at 0° – 5°, while stirring, to an acetic acid solution of 13.9 g (0.11 mol) nitroacetalodoxime sodium in 200 ml of water. When the coupling is completed, the precipitated azo compound is filtered off with suction, washed and dried. There are obtained 29 g of the orange-coloured azo compound which are introduced with stirring into a mixture of 100 ml dimethyl formamide, 20 ml acetic anhydride, 20 ml acetic acid and 8 g sodium acetate. The mixture is subsequently stirred at 90° – 100° for 2 hours, the bulk of the dimethyl formamide and acetic acid is distilled off under reduced pressure, the residue is mixed with 200 ml of 50 percent methanol, and after some time the undissolved material is filtered off with suction. For purification, the product is recrystallised from dimethyl formamide/alcohol and methyl glycol, and 3-[pyrazolyl-(1)]-7-[4-nitro-v-triazolyl-(2)]- coumarin is obtained in the form of yellow granular crystals of melting point 255° – 256°; yield 17 g.

16.2 g (0.05 mol) 3-[pyrazolyl-(1)]-7-[4-nitro-v-triazolyl-(2)]-coumarin are suspended in 100 ml dimethyl formamide and, after the addition of 10 g Raney nickel, hydrogenated at 50° under a hydrogen pressure of 50 at. When the absorption of hydrogen is terminated, the product is filtered off with suction from the catalyst while still hot, and the solvent is distilled off. After recrystallisation from methyl gylcol, the 3-[pyrazolyl(1)]-7-[4-amino-v- triazolyl-(2)]-coumarin is obtained in the form of yellow crystals of melting point 236° – 239°; yield 12.9 g.

a. 5.9 g (0.02 mol) 3-[pyrazolyl-(1)]-7-[4-amino-v-triazolyl-(2)-]-coumarin are stirred in 45 ml pyridine with 3.5 ml acetic anhydride at 50° for 1 hour. The pyridine is subsequently driven off with steam and the residue is recrystallised from methyl glycol. 5 g 3-[pyrazolyl-(1)]-7- [4-acetamino-v-triazolyl-(2)]-coumarin are obtained in the form of light, almost colourless crystals of melting point 248° – 250°.

The pyrazolyl-acylamino-triazolyl-coumarin compounds listed in the following Table are obtained in an analogous manner from 3-[pyrazolyl-(1)]-7-[4-amino-v-triazolyl- (2)]-coumarin. The acylating agent used is stated in the right-hand column.

TABLE 3-pyrazole-7-triazolyl-coumarins of the formula

| No. | R₂ | Acylating agent |
|---|---|---|
| 3(b) | NH—CO—C₂H₅ | Propionyl chloride. |
| 3(c) | NH—CO—C₃H₇ | Butyryl chloride. |
| 3(d) | NH—CO—CH₂—CH(CH₃)₂ | Isovaleryl chloride. |
| 3(e) | NH—CO—OC₂H₅ | Chloroformic acid ethyl ester. |
| 3(f) | NH—CO—⌬—OCH₃ | p-Anisoyl chloride. |
| 3(g) | NH—CO—⌬ | Benzoyl chloride. |
| 3(h) | NH—CO—⌬—CH₃ | p-Toluyl chloride. |
| 3(i) | NH—CO—⌬(Cl) | o-Chlorobenzoyl chloride. |
| 3(k) | NH—(triazine with Cl, CH₃, O—CH(CH₃)₂) | 2,4-dichloro-6-isopropoxy-s-triazine. |
| 3(l) | NH—(triazine with N(C₂H₅)₂, N(C₂H₅)₂) | 2-chloro-4,6-bis-diethylamino-2-triazine. |
| 3(m) | NH—(triazine with N(C₃H₇), N—⌬CH₃) | 2-chloro-4-dipropylamino-6-o-toluidino-2-triazine. |
| 3(n) | pyrrolidinone group | Butyrolactone. |

EXAMPLE 4

A fabric of polyester fibres is introduced in a liquor ratio of 1 : 40 into a bath consisting, per litre, 1.5 g sodium oleyl-sulphonate, 0.75 g formic acid and 0.1 g 3-[pyrazolyl-(1)]-7-[4-phenyl-5-methyl-v-triazolyl-(2)]-coumarin the preparation of which is described in Example 1(a). The bath is heated to boiling temperature in the course of 30 minutes and kept at boiling temperature for about 45 minutes while the fabric is moderately moved about. The fabric is subsequently rinsed and dried. It then exhibits an outstandingly brilliant and strong brightening effect of excellent fastness to light, washing and chlorite.

The brightening effect thus achieved is stronger and clearer than the brightening effect achieved in the same way with the most closely related compound, 3-[pyrazolyl-(1)]- naphthotriazolyl-coumarin, described in Belgian Pat. No. 681,962.

EXAMPLE 5

A fabric of polyester fibres is padded with an aqueous liquor containing, per litre, 1 g of one of the compounds stated in Examples 1(a) – ($b_1$) and ($h_1$) – ($k_1$) or 2(a), (b), (d) and (e), as well as 3 g of a commercial dispersion agent based on fatty alcohol polyglycol ethers. The fabric is then squeezed to a weight increase of 100 percent, then dried and heated at 120°for 30 minutes. Compared with untreated material, the fabric thus treated exhibits a strong clear brightening effect of very good fastness to light, wet processing and chlorite.

EXAMPLE 6

A fabric of polyester fibres is padded with an aqueous liquor containing, per litre, 1 g of a commerical dispersion agent based on fatty alcohol polyglycol ethers, 1 g of a commercial wetting agent based on alkyl-naphthalene- sulphonic acid, 4 g of an alginate thickening agent, and a solution of 1 g of one of the compounds stated in Examples 1 (a) – ($b_1$), 1($e_1$) – ($k_l$) or 2(a) – (f). The fabric is then squeezed to a weight increase of 100 percent, dried, heated at 190° for 1 minute, and subsequently washed hot. Compared with untreated material, it exhibits a very strong and brilliant brightening effect of excellent fastness to light, washing and chlorite.

Compared with the most closely related phenyl-triazolyl-coumarins described in Belgian Pat. No. 695,656, the pyrazolyl-triazolyl-coumarins according to the invention give stronger and clearer brightening effects; for example, the brightening effects obtained in this way with 3-[pyrazolyl-(1)]-7-[4-phenyl- or 4-p-chlorophenyl-5- methyl-v-triazolyl-(2)]-coumarin [Example 1(a) or 1(p) or 1(q)] are stronger and clearer than those obtained with the corresponding 3-phenyl-7-[4-phenyl or 4-p-chlorophenyl-5-methyl-v-triazolyl-(2)]-coumarin (Belgian Pat. No. 695,656, Example 1(c) or 1(d)).

EXAMPLE 7

6 kg terephthalic acid dimethyl ester and 5 litres ethylene glycol are mixed in a stirrer autoclave with 0.05 percent zinc acetate and 0.03 percent (referred to terephthalic acid dimethyl ester) of one of the compounds of the formula (I) stated in Examples 1(a) – ($m_1$). The autoclave is first heated with stirring at 180°C. Transesterification starts at about 150°; the eliminated methanol is distilled off.

The temperature is raised to 200° after 1 hour and to 220° after a further 45 minutes. The transesterification is completed after 2¾ hours in all. The total quantity of eliminated methanol amounts to at least 2.4 litres.

The product so obtained is transferred to an autoclave heated at 275°, for precondensation under nitrogen. During the precondensation, the excess glycol is directly passed over a condenser and collected. After 45 minutes, an initially weak vacuum is applied which is increased to (below) 1 mm Hg in the course of a further 45 minutes. The speed of stirring is reduced. The polycondensation is completed after 2½ hours. The product obtained is subsequently extruded in known manner to produce filaments with a final titre of 50/25. The filaments so obtained exhibit an outstanding brightening effect of excellent fastness to light and wet processing.

EXAMPLE 8

A fabric of cellulose acetate fibres is moved about in a liquor ratio of 1 : 40 at 60° for 45 minutes in an aqueous bath containing, per litre, 1 g sodium oleyl sulphonate, 0.75 g formic acid and 0.1 g of one of the compounds of the formula (I) stated in Examples 1(b) – (e) or 3(a) – (n). The fabric is subsequently rinsed and dried. After this treatment the material exhibits an excellent brightening effect.

EXAMPLE 9

1 g of one of the compounds stated in Example 1 under (i), (x), (y), ($g_1$) – ($k_1$) and in Example 3 (a) – (n) is incorporated with 1 kg of opaque soft polyvinyl chloride. The material then exhibits an outstanding brightening effect and a clear white shade.

EXAMPLE 10

0.5 g of one of the compounds stated in Examples 1(a) – (h), 2(a) – (e) and 3(b) – (i) are dissolved in 1 kg of a colourless varnish of nirocellulose or cellulose acetate. The varnish is then thinly spread on a colourless substrate. After drying, the varnish layer is excellently brightened.

We claim:

1. A 3-[pyrazolyl-(1)]-7-[v-triazolyl-(2)]- coumarin of the formula

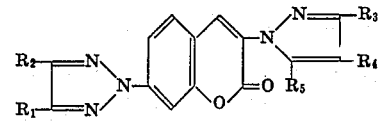

in which $R_1$ is hydrogen; a straight-chain branched or cyclic, alkyl or alkenyl radical of 1–12 carbon atoms which is unsubstituted or mono-substituted with fluorine, chlorine, bromine, hydroxy, $C_1$–$C_4$-alkoxy, ($C_1$–$C_4$-alkoxy)-carbonyloxy, COOH, ($C_1$–$C_4$-alkoxy)- carbonyl, phenyl, halophenyl, lower alkyl phenyl or lower alkoxyphenyl, naphthyl, phenyl; or naphthyl or phenyl mono- or di-substituted with fluorine, chlorine, bromine, cyano, $C_1$–$C_4$-alkyl, $C_1$1–$C_4$-alkoxy, —COOH, ($C_1$–$C_5$-akoxy)-carbonyl, $C_1$–$C_4$-alkylsulfonyl, benzyl or benzyloxy;

$R_2$ is a straight-chain branched or cyclic, alkyl or alkenyl radical of 1–12 carbon atoms which is unsubstituted or is mono-substituted with fluorine, chlorine, bromine, hydroxy, $C_1$–$C_4$-alkoxy, alkoxy, ($C_1$–$C_4$-alkoxy)-carbonyloxy, COOH, ($C_1$–$C_4$-alkoxy)-carbonyl, phenyl, halophenyl, lower alkyl phenyl or lower alkoxyphenyl; naphthyl; phenyl; or naphthyl or phenyl mono- or di-substituted with fluorine, chlorine, bromine, cyano, $C_1$–$C_4$-alkyl, $C_1$–$C_4$-alkoxy, COOH, ($C_1$–$C_4$-alkoxy)-carbonyl, $C_1$–$C_4$-alkylsulfonyl, benzyl or benzyloxy; cyano; COOH; ($C_1$–$C_4$-alkoxy)-carbonyl; —$CONH_2$; —CONH-(C-$C_4$-alkyl); —CON—($C_1$–$C_4$-alkyl)$_2$; ($C_1$–$C_4$-alkenyl)-carbonylamino; phenylcarbonylcarbonylamino; ($C_1$–$C_{10}$-alkenyl)-carbonylamino; phenylcarbonylamino; phenylcarbonylamino mono-substituted with chloro, methyl or methoxy; N-pyrrolidonyl; s-triazinylamino; or s-triazinylamino mono- or di-substituted by halogen, methyl, methoxy, ethoxy, propoxy, ethylamino, dimethylamino, diethylamino, dipropylamino, anilino, or toluidino; or $R_1$ and $R_2$ taken together are —$CH_2$—$CH_2$—$CH_2$—, —$CH_2$—$CH_2$—$CH_2$—$Ch_2$— or

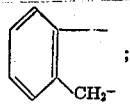

$R_3$, $R_4$ and $R_5$ are hydrogen; $C_1$–$C_4$-alkyl; phenyl; or phenyl mono-substituted with chlorine, bromine, methyl, or methoxy.

2. A 3-[pyrazolyl-(1)]-7-[v-triazolyl-(2)]- coumarin of claim 1 in which $R_1$ is hydrogen; $C_1$–$C_4$-alkyl; cyclohexyl; benzyl; phenyl; or phenyl mono-substituted with fluorine, chlorine, bromine, cyano, $C_1$–$C_4$-alkyl, $C_1$–$C_4$-alkoxy, —COOH, ($C_1$–$C_4$-alkoxy)- carbonyl, $C_1$–$C_4$-alkylsulfonyl, benzyl or benzyloxy;

$R_2$ is $C_1$–$C_{10}$-alkyl; cyclohexyl; benzyl; naphthyl; phenyl; or phenyl mono-substituted with fluorine, chlorine, bromine, cyano, $C_1$–$C_4$-alkyl, $C_1$–$C_4$-alkoxy, —COOH, ($C_1$–$C_4$-alkoxy)-carbonyl, $C_1$–$C_4$-alkylsulfonyl, benzyl or benzyloxy; or $R_1$ and $R_2$ together with two carbon atoms of the triazole ring in the above formula form a cyclopentane ring or a cyclohexane ring;

$R_3$ is hydrogen, methyl, phenyl, p-tolyl, or p-anisyl; and $R_4$ and $R_5$ are hydrogen or methyl.

3. A 3-[pyrazolyl-(1)]-7-[v-triazolyl-(2)]- coumarin of claim 1 in which $R_2$ is cyano; —COOH; —$CONH_2$; ($C_1$–$C_4$-alkoxy)-carbonyl; ($C_1$–$C_4$-alkyl)-carbonylamino; phenylcarbonylamino; s-triazinylamino; phenylcarbonylamino mono-substituted with chloro, methyl or methoxy; or s-triazinyl amino mono- or di-substituted by halogen, methyl, methoxy, ethoxy, propoxy, ethylamino, dimethylamino, diethylamino, dipropylamino, anilino or toluidino; and $R_3$, $R_4$ and $R_5$ are hydrogen.

4. A 3-[pyrazolyl-(1)]-7-[v-triazolyl-(2)]- coumarin of claim 1 in which $R_1$ is $C_1$–$C_4$-alkyl; cyclohexyl; benzyl; phenyl; or phenyl mono-substituted with fluorine, chlorine, bromine, cyano, $C_1$–$C_4$-alkyl, $C_1$–$C_4$-alkoxy, —COOH, ($C_1$–$C_4$-alkoxy)-carbonyl, $C_1$–$C_4$-alkylsulfonyl, benzyl, or benzyloxy;

$R_2$ is cyano; —COOH; $CONH_2$; ($C_1$–$C_4$-alkyl)-carbonyl- amino; ($C_1$–$C_4$-chloroalkyl)-carbonylamino; benzoylamino; chlorobenzoylamino; methylbenzoylamino; methoxybenzoylamino; ($C_1$–$C_4$-alkoxy)-carbonylamino; 4-chloro-6-methoxy-s-triazinylamino-(2); 4-chloro-6-ethoxy-s-triazinyl-amino-(2); 4-chloro-6-propoxy-s-triazinyl-amino-(2); 4-chloro-6-isopropoxy-s-triazinyl-amino-(2); 4,6-bis-dimethylamino-s-triazinyl-amino-(2); 4,6-bix-diethylamino-s-triazinyl-amino-(2); 4,6-bis-dipropylamino-s-triazinyl-amino-(2); 4-ethylamino-6-anilino-s-triazinyl-amino-(2); 4-diproylamino-6-anilino-s-triazinyl-amino-(2); 4-dipropylamino-6-o-toluidino-s-triazinyl-amino-(2); 4-methyl-6-methoxy-s-triazinyl-amino-(methoxy-s-triazinyl-amino-(2); 4-methyl-6-ethoxy-s-triazinylamino-(2); or N-pyrrolidonyl.

5. 3-[Pyrazolyl-(1)]-7-[v-triazolyl-(2)]-coumarin of claim 1 in which $R_1$ and $R_2$ together with two carbon atoms of the triazole ring form a cyclopentane ring or a cyclohexane ring.

6. 3-[Pyrazolyl-(1)]-7-[v-triazolyl-(2)]-coumarin of claim 1 in which $R_3$ is hydrogen, methyl, phenyl, p-tolyl or p-anisyl; and $R_4$ and $R_5$ are hydrogen or methyl.

* * * * *